Patented Feb. 16, 1932

1,845,469

UNITED STATES PATENT OFFICE

HUGO WOLFF, OF MANNHEIM, AND ERNST HONOLD, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

VAT DYESTUFFS OF THE ACRIDINE SERIES

No Drawing. Application filed April 21, 1930, Serial No. 446,181, and in Germany April 29, 1929.

The present invention relates to the production of vat dyestuffs of the benzanthrone series.

We have found that those anthraquinonyl-aminobenzanthrones which contain several anthraquinonylamino radicles in the molecule and of which one is connected in its 1-position to the Bzl-position of the benzanthrone nucleus are converted into valuable vat dyestuffs by treatment with alkaline condensing agents. Caustic alkalies, diluted, if desired, with organic solvents, or the alkali metal compounds of aniline and the like, or the other known alkaline condensing agents may be employed for the purpose of the present invention. The products thus obtained probably correspond to the following formula:

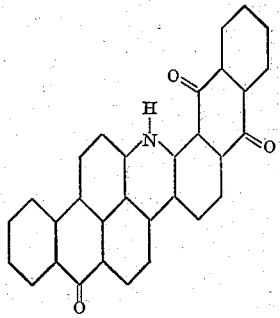

in which at least one further aminoanthraquinonyl radicle is attached to the benzanthrone nucleus, and in which the benzanthrone and the aminoanthraquinonyl radicles may be further substituted. These dyestuffs usually dissolve in concentrated sulphuric acid to give green solutions and give from olive to brown dyeings on cotton. The dyestuffs thus obtained may if desired still be subjected to a subsequent treatment with acid condensing agents, the shades of the dyestuffs being changed by the said treatment. The usual acid condensing agents may be used, for example sulphuric acid or aluminium chloride to which alkali metal chlorides may be added.

The following examples will further illustrate the nature of this invention but the invention is not restricted to these examples. The parts are by weight.

Example 1

10 parts of di-(1'-anthraquinonyl)-6.Bzl-diaminobenzanthrone (obtainable by condensation of 1 molecular proportion of 6.Bzl-dihalogenbenzanthrone with 2 molecular proportions of 1-amino-anthraquinone) are slowly introduced while stirring at from 180° to 200° C. into a melt of 40 parts of caustic potash and from 20 to 25 parts of alcohol and the whole is fused at this temperature until the formation of the dyestuff is complete. The cooled melt is boiled up with water, filtered and washed. The dyestuff thus obtained is a dark paste drying to a dark powder which dissolves in concentrated sulphuric acid giving a green coloration. The dyestuff gives a grey brown colored vat with caustic soda solution and hydrosulphite, from which vegetable fibres are dyed in olive brown shades.

Example 2

5 parts of the dyestuff obtained according to Example 1 are dissolved in 75 parts of concentrated sulphuric acid and are heated at from about 80° to 100° C. until the original green coloration of the solution has changed to blue, which is the case in a shorter or longer period of time according to the strength of the sulphuric acid. The melt is then poured into water when the dyestuff separates as a flocculent green precipitate. The dyestuff is filtered, washed with hot water and brought into the form of paste. The dyestuff is a green black paste which when dried is a dark powder which dissolves in concentrated sulphuric acid giving a blue coloration. The dyestuff gives a blue vat with caustic soda solution and hydrosulphite, from which vegetable fibres are dyed green shades.

Example 3

10 parts of the condensation product from 1 molecular proportion of 6.Bzl-dihalogenbenzanthrone with 2 molecular proportions of 1.6-diaminoanthraquinone are introduced at about 160° C. into a melt of 40 parts of caustic potash and from 20 to 25 parts of methyl alcohol and are fused until unchanged initial material can no longer be detected. The dyestuff worked up in the usual manner is a dark paste which dyes vegetable fibres olive brown shades from a grey brown colored vat. When dry the dyestuff is a dark powder which dissolves in concentrated sulphuric acid giving a green coloration which changes to blue when the solution is heated.

Example 4

10 parts of di-(1'-anthraquinonyl)-7-Bzl-diaminobenzanthrone (obtainable by condensation of 1 molecular proportion of Bzl-bromo-7-chlorbenzanthrone with 2 molecular proportions of 1-aminoanthraquinone) are fused as described in Example 3. After the usual working up of the melt, the dyestuff is obtained in the form of a dark colored paste which gives a brown vat with caustic soda solution and hydrosulphite from which the vegetable fibres are dyed in dark brown shades. The dyestuff dissolves in concentrated sulphuric acid giving a green coloration which changes to red brown when the solution is heated.

Example 5

10 parts of tri-(1'-anthraquinonyl)-tri-aminobenzanthrone (obtainable by condensation of 1 molecular proportion of tribromobenzanthrone with 3 molecular proportions of 1-aminoanthraquinone) are fused as described in Example 1 with alcoholic potash. The dyestuff, worked up in the usual manner, is a dark paste which when dry is a black powder which dissolves in concentrated sulphuric acid giving a grey brown coloration. The dyestuff gives a brown vat with caustic soda solution and hydrosulphite from which vegetable fibres are dyed in fast brown shades which are distinguished by good fastness to bucking.

Example 6

30 parts of the condensation product obtainable from 1 molecular proportion of 6-Bzl-dibromobenzanthrone and 2 molecular proportions of 1-amino-4-anilido-anthraquinone, are slowly introduced into a melt of 150 parts of caustic potash and 50 parts of ethyl alcohol kept at 160° to 170° C. The reaction temperature is then slowly raised during 1 hour to between 190° and 200° C. The cooled melt is taken up with water and the dyestuff recovered in the usual manner. It dissolves in concentrated sulphuric acid to give an olive solution and dyes cotton fast olive grey shades from a brownish black vat.

Example 7

10 parts of the dyestuff prepared according to the foregoing example are slowly introduced into a melt of 50 parts of aluminium chloride and 10 parts of sodium chloride kept at 150° C. The temperature is then slowly raised to 160° C. and kept thereat for 2 hours. The reaction mixture is decomposed after cooling by means of water and dilute hydrochloric acid. The dyestuff recovered in the usual manner dissolves in concentrated sulphuric acid to give a dark brown solution and dyes cotton from a violet black vat shades similar to those obtained with the initial material.

Example 8

20 parts of the condensation product obtainable from 1 molecular proportion of 6.Bzl-dibromobenzanthrone and 2 molecular proportions of 1-amino-5-benzoylamino-anthraquinone are introduced at 150° C. into a suspension of 90 parts of sodium anilide in 310 parts of anhydrous aniline, while passing nitrogen through the suspension. The reaction mixture is stirred at the said temperature until the formation of the dyestuff is complete, whereupon the reaction mixture is allowed to cool, poured into an excess of dilute hydrochloric acid, the precipitate filtered off and washed with water. The dyestuff is thus obtained in the form of a dark colored paste which dyes cotton from a grey blue vat olive brown shades. The dyestuff is a dark powder when dried, dissolving in concentrated sulphuric acid to give a green solution changing to green blue on standing.

If a condensation product obtainable from 1 molecular proportion of 6.Bzl-dibromobenzanthrone and 2 molecular proportions of 1-amino-4-benzoylaminoanthraquinone, or 1 molecular proportion each of 1-amino-5-benzoylaminoanthraquinone and 1-aminoanthraquinone or another aminoanthraquinone derivative, be condensed in the aforedescribed manner dyestuffs of similar properties are obtained.

What we claim is:—

1. A process of producing vat dyestuffs which comprises treating a benzanthrone substituted by several anthraquinonylamino radicles of which one is connected in its 1-position to the Bzl-position of the benzanthrone with an alkaline condensing agent.

2. A process of producing vat dyestuffs which comprises treating a benzanthrone substituted by several anthraquinonylamino radicles of which one is connected in its 1-position to the Bzl-position of the benzanthrone with an alkaline condensing agent and subjecting the condensation product thus produced to further condensation by means of an acid condensing agent.

3. As new articles of manufacture vat dyestuffs having probably the following general structure:

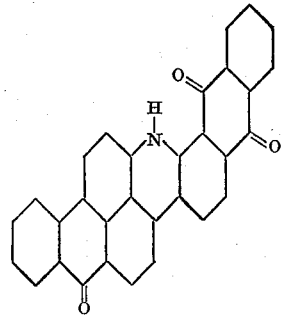

in which at least one further aminoanthraquinonyl radicle is attached to the benzanthrone nucleus, the said dyestuffs usually dissolving in concentrated sulphuric acid to give green solutions and dyeing cotton from olive to brown shades.

4. As a new article of manufacture the vat dyestuff probably corresponding to the formula:

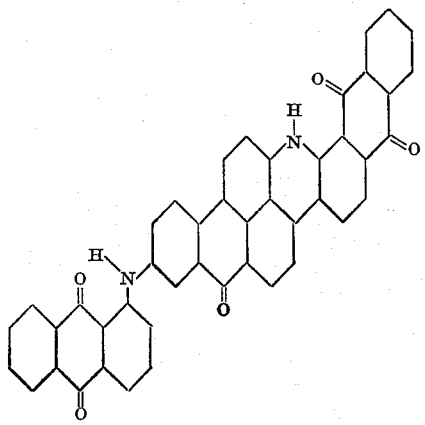

the said dyestuff dissolving in concentrated sulphuric acid to give a green solution and dyeing cotton from a grey brown vat olive brown shades.

In testimony whereof we have hereunto set our hands.

HUGO WOLFF.
ERNST HONOLD.